(No Model.) 2 Sheets—Sheet 1.

J. GREENWOOD.
BARREL HEAD MACHINE.

No. 592,467. Patented Oct. 26, 1897.

Witnesses.
A. R. Selden.
E. H. Marsellus.

Inventor.
John Greenwood,
by Howard L. Osgood,
Attorney.

(No Model.) 2 Sheets—Sheet 2.
J. GREENWOOD.
BARREL HEAD MACHINE.
No. 592,467. Patented Oct. 26, 1897.
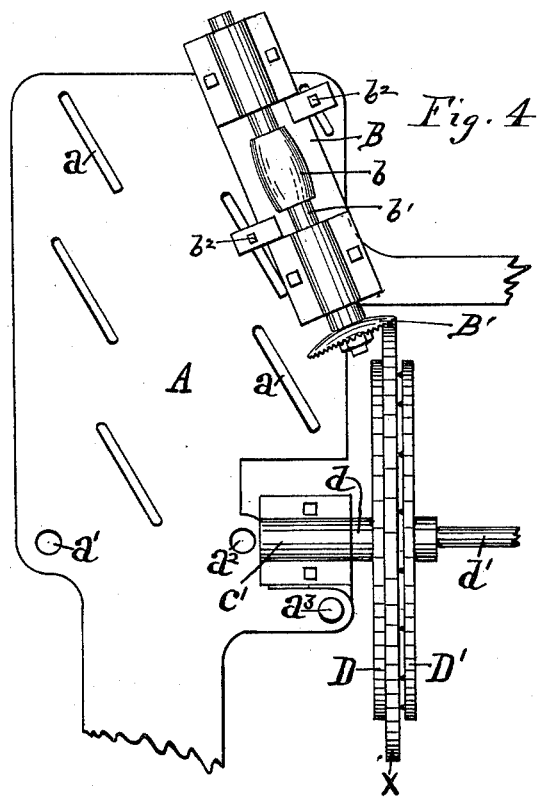
Fig. 4.
Fig. 8.
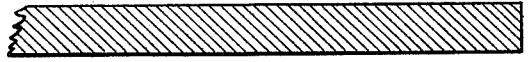
Witnesses.
A. R. Selden.
E. H. Marsellus
Inventor.
John Greenwood
by Howard L. Osgood
Attorney.

UNITED STATES PATENT OFFICE.

JOHN GREENWOOD, OF ROCHESTER, NEW YORK.

BARREL-HEAD MACHINE.

SPECIFICATION forming part of Letters Patent No. 592,467, dated October 26, 1897.

Application filed December 26, 1896. Serial No. 617,128. (No model.)

*To all whom it may concern:*

Be it known that I, JOHN GREENWOOD, a citizen of the United States, and a resident of the city of Rochester, in the county of Monroe and State of New York, have invented certain new and useful Improvements in Barrel-Head Machines, of which the following is a specification, reference being had to the accompanying drawings, in which—

Figure 1:
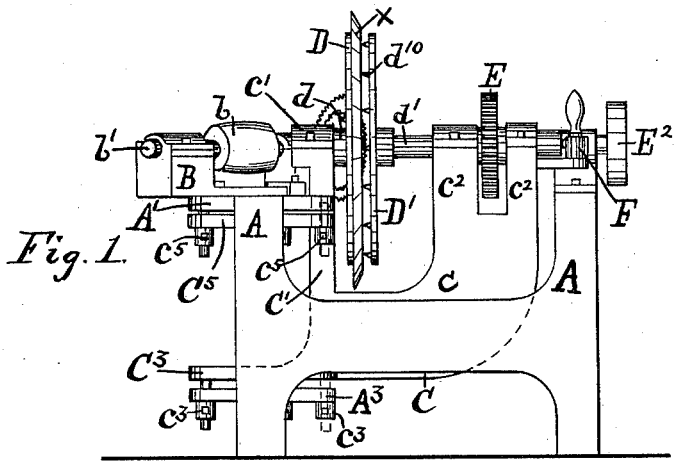
Figure 2:
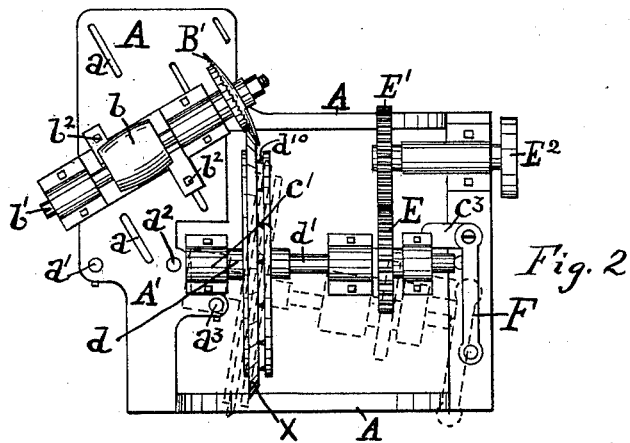
Figure 6:
Figure 3:
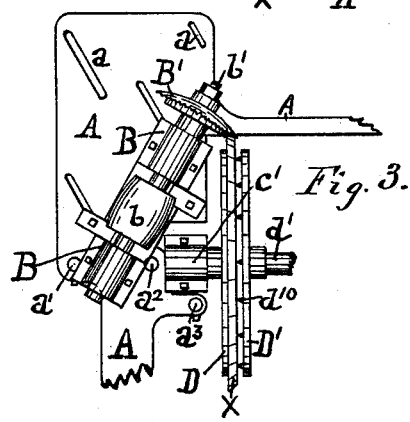
Figure 7:

Figure 1 is an end elevation of one of my machines. Fig. 2 is a top plan view thereof with the parts set in the same positions, as shown in full lines in Fig. 1. Fig. 3 is a partial top plan showing the parts in position in dotted lines in Fig. 1. Fig. 4 shows an arrangement for sawing a square edge, and Figs. 5, 6, 7, and 8 are cross-sections of the forms of edges of barrel-heads produced by my machine.

In the drawings, A is the frame of the machine, and B is a bracket set upon a top plate of said machine and bearing a pulley $b$ and an arbor $b'$. On the arbor $b'$ is removably fastened a dished circular saw B', such as is commonly used in sawing barrel-heads. The bracket B is fastened to the frame A by means of bolts $b^2$, passing through slots $a$ in said frame, and said slots are so placed that the position of the bracket may be varied according to the character of the work desired. A swinging frame-piece C carries a chuck for holding a barrel-head blank and for moving said blank up to the saw B' to cut the blank into the proper circular form and with the proper bevel of its edge. The horizontal arbor $b'$ of the saw B' is arranged to swing and to be adjusted in one plane, while the swinging frame-piece C is pivoted in a vertical plane which is at right angles to the plane of adjustment of the saw-arbor. The axis of the chuck is horizontal and in a plane at right angles to the plane of the pivots of the frame C.

On the swinging frame C is journaled a chuck-plate D, freely revoluble upon an axis $d$ in a horizontal plane, and said axis is set in a bearing $c'$ on an arm C' of the swinging frame C. Upon another arm C² of said swinging frame is journaled a gear-wheel E, revoluble between arms $c^2$. Within the hub of the wheel E, and in line with the arbor $d$, above mentioned, is an arbor $d'$, to which is splined the gear-wheel E in an obvious manner, so that the arbor $b'$ is longitudinally movable with reference to the gear-wheel E, while the gear-wheel remains in fixed bearings, and when revolving drives the arbor $b'$. Upon this arbor $b'$ is a chuck-plate D', having a series of teeth $d^{10}$. A lever F is pivoted upon a bracket $c^3$ and is adapted to be pressed against the outer end of the shaft or arbor $b'$, whereby the arbor may be pressed toward the plate D, and a barrel-head blank X may thus be clamped between the plates D and D'. A plate C³ extends from the lower portion of the swinging frame C and rests over a plate A³, attached to the frame A. A plate C⁵, above the plate C³, is attached to the arm C' of the swinging frame C and rests under the flat table A' of the frame A. Pivot-screws $c^5$ pass through the plate C⁵ and into suitable sockets or perforations $a'$ $a^2$ $a^3$ in the plate A', while pivot-screws $c^3$ pass through the plate A³ and rest in suitable sockets or perforations in the plate C³. The sockets in the plate C³ are directly under the sockets or perforations $a'$ $a^2$ $a^3$ in the upper plate A'. Consequently if a pair of pins $c^3$ $c^5$ are placed in a pair of sockets, as $a'$, and its corresponding socket the frame C can be swung upon this pair of pins and the barrel-head blank X moves up to the saw B' to cut the edge on a particular selected bevel.

Figure 5:

Machines have been produced whereby a single edge bevel of barrel-head may be produced; but, so far as I know, no machine has heretofore been produced which is capable of high speed, quick insertion of the blanks and removal of barrel-heads, and at the same time adjustment to produce barrel-heads of different edge bevels. This I accomplish in my present machine. Barrel-heads must at present be produced cheaply and automatically. I consequently provide a machine in which by means of the lever F the barrel-head blank X may be quickly clamped between its chuck-plates when in the position shown in dotted lines in Fig. 2, and may be rapidly moved from that position up to a position in which the gear E meshes with a gear E' upon a stationary arbor on the frame driven by a driving-pulley E². This latter position is shown in full lines in said Fig. 2. It is to be understood that the saw B' is constantly driven, and when the parts are moved into the full-line position shown in Fig. 1 the saw has cut completely through the barrel-head blank before the gears E E' have meshed and have begun to revolve the arbor $d'$ and with it the chuck-plates; but as soon as the frame C has been swung to the full-line position of Fig. 2 the gears E E' have meshed and the arbor $b'$ begins to revolve, whereby the barrel-head is cut by the saw B' into its circular form and with the proper bevel. On moving the lever F to the dotted-line position of Fig. 2, the finished barrel-head may be released and a new blank inserted and the operation of cutting a new blank may be repeated with great speed. It is essential, in order that high speed may be attained, that the parts should be solidly fixed in position, that the pivot or pivots of any swinging part should be very firmly fixed, and that there should be no slip or looseness. All these advantages I produce in the machine herein set forth. If the pivotal axis of the frame C passes through the socket $a'$ and the corresponding socket below, a bevel of long radius is produced, such as shown in Fig. 5. If the pivotal axis of the frame C is set nearer to the chuck-plates D D', as at $a^2$, thereby not only shortening the radius of swing of the chuck-plates, but also correspondingly shifting the pivot-point of the said frame, a less acute bevel is produced on a barrel-head of the same size as that turned out before when the said frame was pivoted at $a'$. It is evident that a change in the radius of swing of the chuck-plates alone would produce not only a different bevel, but also a head of a different size. In order, therefore, to change the bevel without varying the size of the head, it is necessary to simultaneously shift the pivot-point of said frame C a distance corresponding with the change in radius.

In Fig. 4 the machine is adjusted to produce a head with square edge, such as is used for the heads of butter-tubs and of cheese-boxes. In this case the saw-bracket and saw-arbor are turned around so as to lie in a line substantially parallel with the plane of the chuck-plates when the latter are brought to the position shown in Fig. 4, and the saw is reversed on the arbor for cutting these square edge heads. Each of the positions of the saw-bracket above mentioned is capable of some change, as the slots in the table are sufficiently long to permit this. Hence it is obvious that the parts may be so adjusted that the edge of the barrel-head may be of any angle to its face from a right angle to a very acute angle. The edges may be formed, beside the main bevel, by cutters on the saw-arbor, as usual.

I thus produce in a barrel-head machine the combination of a saw and suitable chuck-plates for the barrel-head blanks, a series of changeable pivotal devices whereby to swing the chuck-plates on radii of different lengths, and thus produce barrel-heads having different bevels, such as shown in Figs. 5, 6, 7, and 8, for different purposes.

What I claim is—

1. The combination in a barrel-head machine, of a circular saw B', a pair of revoluble clamping chuck-plates D D' for a barrel-head blank, a swinging frame C having fixed bearings for said chuck-plates, and adapted in its swing to bring a blank to said saw, and means for simultaneously and correspondingly changing the radius of swing of said plates and the pivot-point of said frame C, whereby different bevels may be produced on barrel-heads of the same size.

2. The combination in a barrel-head machine, of a circular saw B', a pair of revoluble clamping chuck-plates D D' for a barrel-head blank, a swinging frame C having fixed bearings for said chuck-plates and adapted in its swing to bring a blank to said saw, means for simultaneously and correspondingly changing the radius of swing of said plates and the pivot-point of said frame C, and an adjustable arbor-bracket for said saw, whereby different edge bevels may be produced on barrel-heads of the same or different sizes.

3. The combination in a barrel-head machine, of a circular saw B' having a horizontal arbor $b'$, a swinging frame C having vertical changeable pivots $c^3$ $c^5$ for changing simultaneously and correspondingly the radius of swing of said frame with reference to said saw and the pivot-point of said frame, and a pair of chuck-plates D D' set on horizontal revoluble bearings on said frame C, substantially as and for the purposes described.

4. The combination in a barrel-head machine, of a circular saw B' having a horizontal arbor $b'$, a swinging frame C having vertical changeable pivots $c^3$ $c^5$ for varying the radius of swing of said frame with reference to the saw, an adjustable arbor-bracket for said saw, and a pair of chuck-plates D D' set on horizontal revoluble bearings on said frame C, substantially as and for the purposes described.

JOHN GREENWOOD.

Witnesses:
E. H. MARSELLUS,
ARTHUR R. SELDEN.